Figure 6:
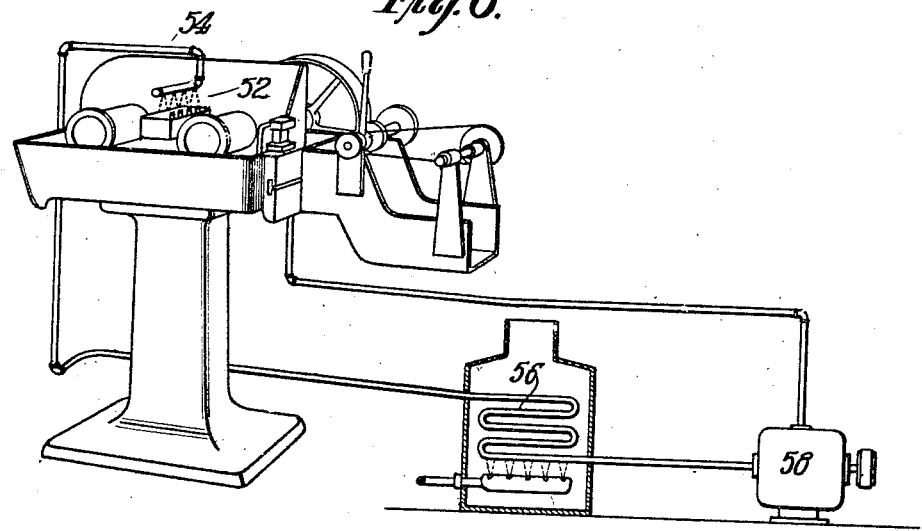

Jan. 12, 1926. 1,569,095
C. A. LAISE
BODY OF HIGH ELECTRON AND LIGHT EMISSION AND PROCESS OF MAKING THE SAME
Filed Nov. 21, 1923    3 Sheets-Sheet 1

Fig. 1.

PREPARATION OF THE TUNGSTEN BASE

Tungstic acid 2000 grams, (substantially pure, less than 0.25% impurities)
↓
Dissolved in 2000cc. C.P. aqua ammonia and 5000cc distilled water
↓
Filtered
↓
Solution A.

½ of solution A. — C.P. HCl added until neutral. Cooled 16 hours. Crystals separated. Crystals washed. Crystals filtered. Dried at 300-400°C.

½ of solution A. — Heated to 70-60°C. Mixed with 3 parts of $HNO_3$, 6 parts of HCl and 4 parts of $H_2O$ at boiling temperature. Precipitate of tungsten oxide. Filtered. Dried.

To each 400 grams add 0.50 Sod. Vanadate, 0.50 Gr. $SiO_2$ in 100cc of $H_2O$.
Heat to drive off moisture.
Mixture B, (Granular).

To each 100 grams add 0.50 grs. of yttrium oxide in solution.
Dried.
Crushed and sieved.
Mixture C, (Amorphous).

Mixed in equal parts in ball mill.
(Heated one hour at 1100°C, (Optional)).
Reduced by hydrogen 2-3 hours at 600-650°C, 5-6 hours at 900-950°C.
Tungsten metal mixture
100 grams

PREPARATION OF THORIUM

Mixture of 30 grams of sodium, 120 grams of thoria, 60 grams of calcium and 300 grams of calcined calcium chloride.
↓
Heated in steel bomb.
↓
Metallic thorium.
↓
Extracted with distilled water and alcohol.
↓
Ground.
↓
Washed with alcohol (50%) and $HNO_3$ (2%).
↓
Dried in vacuum.
↓
Thorium metal.
1-10 grams.

Ground in mortar and mixed in ball mill.
Compressed and finished.

Inventor
C. A. LAISE.
By His Attorney
Cornelius C. Billings

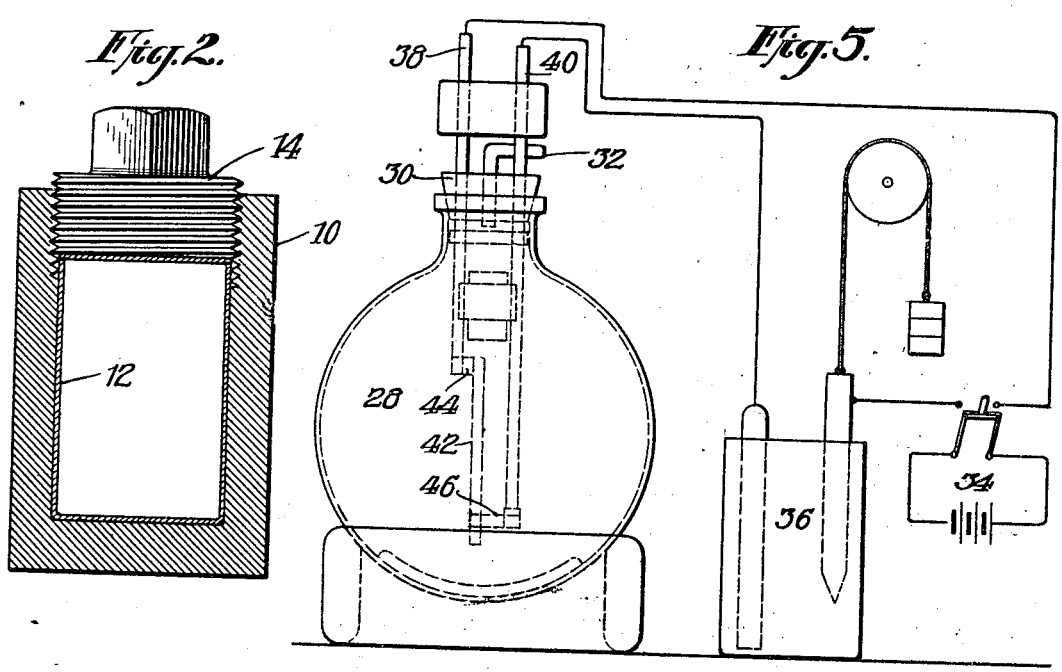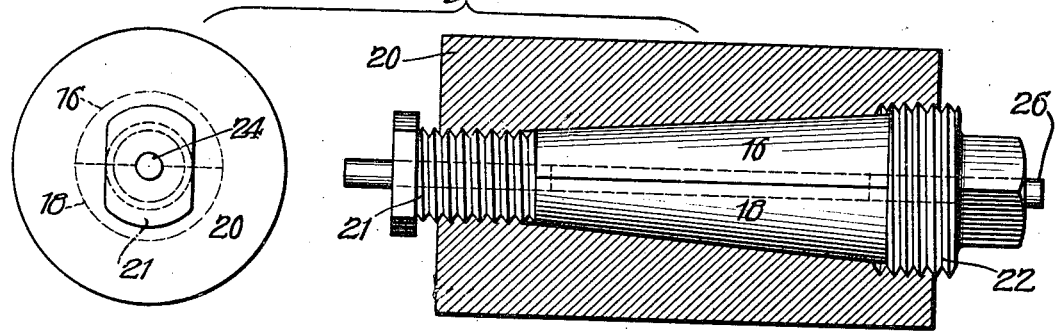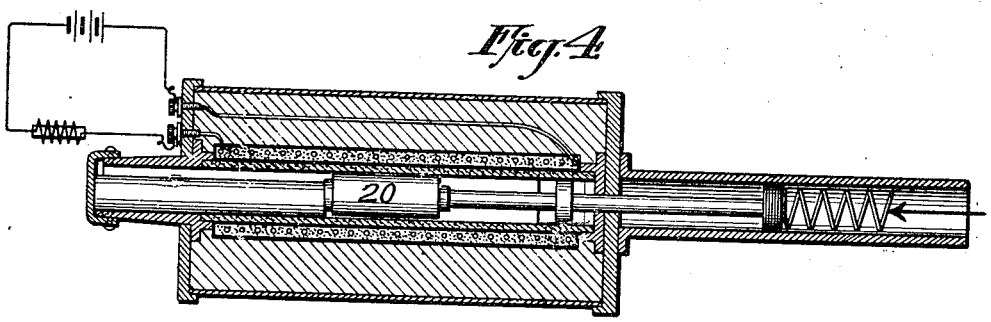

Jan. 12, 1926. 1,569,095
C. A. LAISE
BODY OF HIGH ELECTRON AND LIGHT EMISSION AND PROCESS OF MAKING THE SAME
Filed Nov. 21, 1923    3 Sheets-Sheet 3

Inventor
C. A. LAISE.
By His Attorney

Patented Jan. 12, 1926.

1,569,095

UNITED STATES PATENT OFFICE.

CLEMENS A. LAISE, OF TOLEDO, OHIO, ASSIGNOR TO THE ELECTRON RELAY COMPANY, OF LUCAS COUNTY, OHIO, A CORPORATION OF OHIO.

BODY OF HIGH ELECTRON AND LIGHT EMISSION AND PROCESS OF MAKING THE SAME.

Application filed November 21, 1923. Serial No. 676,007.

*To all whom it may concern:*

Be it known that I, CLEMENS A. LAISE, a citizen of the United States, and a resident of Toledo, county of Lucas, State of Ohio, have invented certain new and useful Improvements in Bodies of High Electron and Light Emission and Processes of Making the Same, of which the following is a specification.

This invention relates to filamentary bodies and more particularly to filamentary bodies having high electron and light emission qualities when raised to incandescence by passing a current through the same and particularly suitable for use in radio bulbs and incandescent electric lamps. The invention also relates to a process for making such filamentary bodies.

Inasmuch as the light emitted from an incandescent body is a function of its temperature, increasing very rapidly as the temperature rises, it has been customary to employ for this purpose a wire or filament of substantially pure tungsten, which can be subjected to a very high temperature without melting. The continued heating at the high temperatures used in incandescent lamps and similar apparatus, however, causes changes in the structure of the wire causing it to lose its ductility and to sag when in coil form in the lamp or bulb.

The light and electron emissive qualities of different materials at equal temperatures vary, however, and the present invention provides a filamentary body having a high light emission and electron emission qualities when operating at high temperatures. The invention also provides a filamentary body which retains its ductility and structure longer than substantially pure tungsten when subjected to equivalent temperature conditions and shows less tendency to sag in coils subjected to long continued heating.

In the formation of filamentary bodies of this character, I produce tungsten mixed or alloyed with thorium and vanadium which greatly increases the ductility and strength of the light emitting body. I also increase the luminous efficiency and retard the loss in ductility by the introduction and dispersal of difficultly reducible refractory oxides such as those of yttrium. The filamentary body is toughened by the interlacing of these various materials. It is also hardened to prevent sagging by the introduction of a small amount of silica which thus affords an improvement in the product for the reason stated but if omitted does not detract from the real and fundamental purposes of the invention. A more permanent set is also provided in my improved filamentary body by flashing the wire at a temperature above its germinative temperature in a final cleaning and annealing operation.

In the formation of an alloy of tungsten and thorium, a reduction of thoria in a body of tungsten through the use of hydrogen has not been found to give satisfactory results, the reduction being incomplete and the unreduced thoria rendering it difficult or impossible to draw the wire to filamentary size such as a wire of 0.001 to 0.002 of an inch diameter, when more than two per cent of thoria is present.

Accordingly, another object or feature of my invention is to provide a process by which a satisfactory homogeneous coherent mixture or alloy of tungsten and thorium may be readily produced. The invention also comprises among its objects a process of forming oxide of yttrium and silicates in a tungsten base in a form suitable for use in producing the improved filamentary body. Other objects are to provide methods for the formation, ductilizing and finishing of the filamentary body and drawing it into final filamentary forms.

With these and other objects in view, the invention comprises the processes and compositions of matter described and set forth in the following specification and claims.

The various features of the invention are illustrated in the accompanying drawings, in which, Fig. 1 is a diagram or flow sheet indicating the various steps employed in the preparation of the product of the present invention.

Fig. 2 is a sectional view of a bomb used in the reduction of thoria to metallic thorium, Fig. 3 is a sectional view of a mold for heat treatment under pressure of materials in the formation of a tungsten base, Fig. 4 is a sectional view of a furnace for heating the tungsten base materials in the mold of Fig. 3, Fig. 5 is a view of an apparatus for electrically heating a bar or ingot of tungsten alloy materials in treating the tungsten preparatory to drawing it into filaments.

Figure 7:
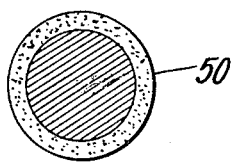
Figure 8:
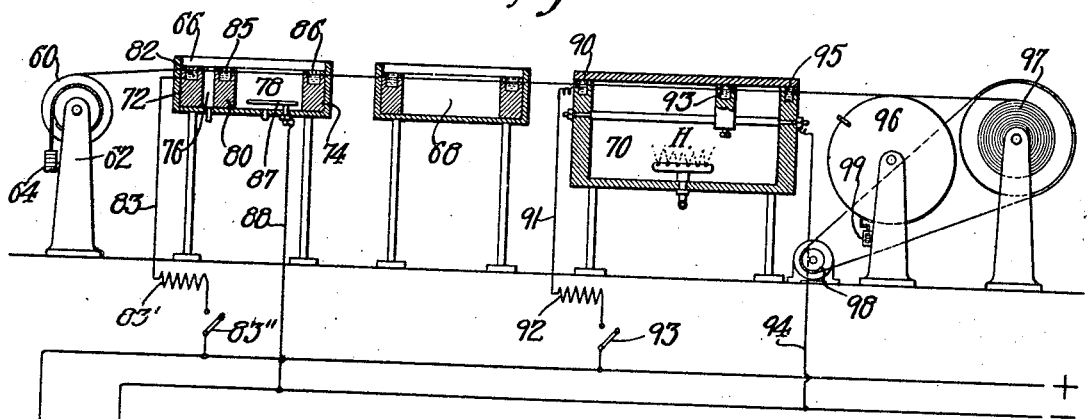

Fig. 6 is a view of a wire drawing apparatus for reducing the filaments to the desired size, Fig. 7 is a cross section of a refractory body after the combined heat and pressure treatment in an oxide envelope, and Fig. 8 is a sectional elevation of an apparatus for cleaning, finishing and imparting a permanent set to the filamentary body.

In forming the filamentary body I prepare a powder containing tungsten metal and small amounts, as hereinafter set forth, of sodium vanadate, potassium silicate and yttrium oxide, or other equivalent refractory, difficultly reducible oxides, and mix this powder with a suitably prepared powder of metallic thorium. The mixture is thoroughly mixed and ground together in a ball mill and is then formed into a billet or slab. It is then rolled or hammered at a high temperature, then at a lower temperature, and reduced in diameter, these operations being carried on in a reducing atmosphere and the billets being annealed at intervals between each operation. The wire thus formed is then treated under heat and pressure to increase the ductility of the wire, preferably as disclosed in my Patent No. 1,470,175 of October 9th, 1923, by forming a refractory coating of oxides on the wire and heating. The wire is then drawn, through dies, the lubricant cleaned off, the wire being subjected to electrolytic action for this purpose and finally heated for a short time in an atmosphere of hydrogen or of hydrogen and nitrogen or in vacuum.

In preparing metallic thorium of sufficient purity for use in forming my alloy, I reduce a compound of thorium by means of a metal of the alkaline or alkaline earth groups, for example by the reduction of thorium chloride with sodium or potassium in a vacuum or by the reduction of thoria by calcium or by a mixture of calcium with a small amount of metallic sodium. In the reduction of thoria with calcium 120 parts by weight of thoria is mixed with 60 parts by weight of calcium and 300 parts by weight of calcined calcium chloride and charged into a bomb such as that shown in Fig. 2. This bomb is formed of a steel shell 10 having a lining of suitable substance, as for example, a thin sheet of molybdenum 12 to prevent contact and contamination of the charged materials with iron from the shell, and the shell is closed by means of a screw threaded steel plug 14, having a similar protecting lining on its inner surface. The bomb is either evacuated through an opening in the plug as well known, or a sufficiently long screw is provided on the plug 14 to insure against the ingress of air after the reaction has taken place. The bomb is then placed in a furnace and heated to a temperature of about 1200 degrees C. and agitated during the heating to establish an intimate contact between the calcium and thoria and to conglomerate the metal into a lump so that it is less easily attacked during its subsequent extraction from the products formed by the reaction.

After the reduction is completed the bomb and its contents are cooled and the calcium compounds extracted from the thorium by means of suitable solvents that protect the thorium metal from oxidation. For this extraction organic solvents, such as pyridine may be employed or a mixture of a suitable organic solvent, such as an alcohol, with water may be employed. Most of the thorium is found in a lump at the bottom of the bomb. This lump is removed, dried, ground to pass through an 80 mesh screen and finally treated with a solution of 2% nitric acid in 50% solution of alcohol in water. The metal is finally treated with absolute alcohol, filtered, and dried in vacuum and should be kept in a dessicator in a vacuum over phosphorous. This metal will analyze above 95% thorium and will conduct current when pressed into a bar, whereas metal contaminated with an appreciable amount of oxide will not conduct a current. This metal is then ready for use with a tungsten base to form a composite wire or filament.

In the tungsten base are incorporated the silicates, vanadium, and refractory oxides, such as yttrium oxide. In forming the tungsten base the silicates and vanadium compounds are preferably incorporated separately from the yttrium oxides, the tungsten being separated into separate portions for this purpose and again united when the various ingredients have been incorporated. In preparing the tungsten compounds for the incorporation of these materials, tungstic acid which has been purified so that it is chemically pure tungsten oxide ($WO_3$) containing not more than 0.25% of mineral impurities is dissolved in a solution of ammonium hydrate in the proportion of 2000 grams of the tungstic acid in 2000 cc. of C. P. ammonium hydrate of a specific gravity of 0.900 and 5000 cc. of distilled water. After stirring for half an hour, most of the tungstic oxide is dissolved and the resulting ammonium tungstate solution is filtered. The filtrate should have but a light tinge of yellow color. This solution may, for convenience, be called solution "A".

This solution is then divided into two parts or halves, in one of which is incorporated the vanadium and silica materials and in the other of which is incorporated the yttrium oxide.

In incorporating the vanadium and silica materials into the portion of solution "A" selected for this purpose, this half of the solution is placed in a porcelain evaporating dish and C. P. hydrochloric acid is run into the solution in a number of fine streams with constant stirring until the solution gets turbid and very fine crystals float around in the liquid; or to the point where the solution is almost neutral. The solution is then permitted to cool for at least 10 hours, and the crystals are allowed to settle. After washing them several times, they are filtered through a Buchner funnel and dried in a nickel pan in a furnace heated to about 300 degrees C. to 400 degrees C., until most of the ammonia is driven off.

Alkaline vanadates and silicates are then incorporated into the oxide thus formed in the proportions of 0.50 grams of sodium vanadate and 0.50 grams of potassium silicate to each 100 grams of the oxide. For this purpose the 0.50 grams of sodium vanadate and 0.50 grams of potassium silicate are dissolved in 100 cc. of water or other suitable solvent and this solution is thoroughly incorporated into the oxide, and the oxide is heated to drive off most of the moisture. This mixture, which consists of more or less crystalline particles of tungsten oxide interspersed with the alkaline vanadate and silicate and which is quite heavy, may be called mixture "B" for convenience in future reference.

The other portion of solution "A" is heated to a temperature of about 70 degrees C. to 80 degrees C. and slowly introduced into a vessel containing a boiling mixture of about 3 parts of nitric acid, 6 parts of hydrochloric acid and 4 parts of water. A current of steam is injected into the mixture while solution "A" is being introduced and a precipitate of tungstic oxide is obtained which is finally removed, filtered, and washed with hot distilled water and finally dried in the form of a fine yellow powder of tungsten oxide. To each 100 grams of this oxide is added 0.50 grams of yttrium nitrate dissolved in a small quantity of distilled water or other suitable solvent, and mixing it thoroughly into the oxide and then drying the mixture by heating it until all of the moisture is driven off. This oxide is then crushed and sifted producing a very fine powdery non-crystalline mixture of tungsten oxide and a rare metal oxide, which for convenience in future reference may be called mixture "C".

Equal quantities of the crystalline mixture "B" and of the amorphus mixture "C" are then thoroughly mixed for at least two hours in a porcelain ball mill. This mixture may then be reduced directly with hydrogen; or may first be heated in a silica dish in a furnace, either gas or electric, for a period of about one hour at about 1100 degrees C. By the latter method a compact, more or less crystalline mass of oxides of fairly coarse structure is obtained. This is then crushed and sieved through an eighty mesh sieve and is then ready for reduction. This mixture may be called mixture "D".

The mixture of oxides produced as outlined above, may now be reduced in any convenient way as by means of hydrogen in a gas or an electric furnace. For this purpose, a charge of the mixture is placed in a nickel boat, which in turn is placed inside a tube of steel, porcelain, alundum or silica, and which is heated from two to three hours at a temperature of about 600 degrees C. to 650 degrees C. and then for about 5 to 6 hours at a temperature of 900 degrees C. to 950 degrees C. while hydrogen is simultaneously passed through the tube. This reduces the material and leaves it as a gray powder having a weight of about 30 to 40 grams per cubic inch. The material may also be reduced in other ways, such, for example, as reduction with carbon, but hydrogen is preferable, or hydrogen bubbled through aqua ammonia. The resulting product consists of a mixture of tungsten metal with the alkaline oxides or alloys and refractory oxides of yttrium and vanadium interspersed throughout the mass.

An alloy mixture is prepared from the substantially pure thorium metal and the tungsten base prepared as above, by mixing from 1 to 10 parts by weight of the thorium to 100 parts by weight of the tungsten base metal. This mixing is accomplished by mixing in a ball mill for about 12 hours. In addition, the mixture is ground together in an agate mortar with an agate pestle so as to thoroughly incorporate the various constituents of the compound alloy into each other.

The resulting homogeneous mixture is now converted into coherent billets. This may be done by compressing the mixture in a suitable mold on a hydraulic press and then baking and sintering the slug in vacuum. However, I prefer to form the billets according to the method described in my Patent No. 1,470,175, of October 9th, 1923, as, in many cases the above mixture is of such a fine structure that the billets do not permit being handled as above outlined without breaking.

Proceeding according to the method described in the above mentioned patent about 100 to 150 grams of the alloy mixture is placed in a nickel-chrome alloy mold such as is shown in Fig. 3. This is a split mold consisting of two inner pieces 16 and 18 tapered to fit into an outer tapered sleeve 20 of the same metal as the inner pieces 16 and 18, and having its ends closed by means of screw plugs 21 and 22, one of which is adapted to force out the inner pieces in case they should stick. After the metal is packed tightly into the mold, by tapping it continuously during the filling operation, it is compressed by means of plungers 24 and 26 which are forced into the mold by hydraulic pressure or other forcing means, the use of two plungers, one at each end being preferred in order to secure a more uniform distribution of pressure.

After the pressure has been applied, the compound mold and sleeve, which have a diameter of about 1¾ inches to 2 inches, is placed into a furnace such as that shown in Fig. 4 and heated under pressure for a period of ½ hour to one hour at a temperature of about 1100 degrees C. in hydrogen or a reducing atmosphere or vacuum. If hydrogen is used, the mold should be perfectly tight so that the hyrodgen can not get in contact with the metal and form a hydride, especially with the thorium metal. For this reason, I prefer to carry on this operation in a vacuum. Instead of the electric furnace a gas furnace may be used, having the mold packed in carbon or carbonized sawdust. After the mold is taken out of the furnace and has cooled, the inner pieces 16 and 18 are loosened by means of the screw 21 and removed from the sleeve and the compacted bar of alloy metal removed. The combined heat and pressure of the outer envelope is sufficient to compact the alloy mixture into a solid coherent billet, having a metallic ring.

The metallic bar is then further heat-treated until it attains the proper shrinkage and structure. This may be done in a tungsten tube or slab furnace also as described in my Patent No. 1,470,175 of October 9th, 1923, or into an apparatus such as shown in Fig. 5. The apparatus shown in Fig. 5 is adapted for small billets but if larger billets are to be treated, a larger apparatus with a water cooled mercury contact on one end may be used. In the apparatus of Fig. 5 the heating apparatus is contained in a container 28 having a large stopper 30 closing the top of the container, an exhaust or exit conduit 32 leading from the container through the stopper to an exhauster or other apparatus by means of which the container may be evacuated. Current for heating the billet is supplied from a generator 34 through a water rheostat 36 and leads 38 and 40 extending through the stopper 30 into the container and to the ends of which the billet 42 is connected by means of strips of tungsten or molybdenum 44 and 46, the lower attachment being so made as to give as much as possible freedom of motion to permit the billet to contract. In heat treating the billet a current equal to about 85% to 95% of that required to fuse the bar or billet is sent through the billet for a period of 10 to 20 minutes.

If a billet formed in the above described manner contains considerable amounts of thorium and is heated in an atmosphere of hydrogen at a temperature of 1000 degrees C. to 1100 degrees C., a hydride of thorium is formed which causes the bar or billet to elongate and renders it apt to fall apart. If the percentage of thorium in the bar is low the bar may be heat treated in an atmosphere of hydrogen but in this case it is necessary to quickly raise the initial temperature of the bar above the dissociating temperature of thorium hydride so that the hydride is not formed to an appreciable extent. In all heat treatments, furthermore, a perfectly dry atmosphere must be used, since moisture or water vapor has a great affinity for thorium.

The resultant product of the above operations is a billet of a coherent, adherent, homogeneous mass of tungsten with small amounts of thorium, of vanadium and of sodium and potassium oxides present as tungsten bronzes, interspersed with grains of refractory oxides, being partially ductile and malleable. It is then ready for ductilizing to convert it from a body of low ductility and malleability into a body suitable for wire drawing, comprising the next step or operation of my process.

In rendering the billets ductile and malleable, the coherent body of alloy and interspersed grains of refractory oxides is hammered or rolled while hot as in the case of the first stages of metal working operations, thereby reducing the size of the billet and imparting a flaky or fibrous structure to the grains. This hammering operation is preferably carried on in an ordinary swaging machine or hammering machine until a diameter of 0.038 of an inch is attained. The temperature maintained for the first six dies is at a white heat or about 1200 degrees C. to 1400 degrees C., and for the balance of the hammering operation a red heat or about 800 degrees C. The reduction in weight per unit length is about 10% in the first six dies and about 15% in the remaining dies. For the first heating an oxy-hydrogen blast furnace is preferably employed, although the ordinary gas and air furnace or electric furnace may be used, it being desirable that the atmosphere in the heating chamber be reducing in nature. As the billet is swaged or pressed to successively smaller dimensions in successive dies, it is subjected to an intermediate annealing after every fourth die, the first two annealings being carried out in vacuum or hydrogen at a temperature above 1800 degrees C. for ten minutes by sending a current through the metallic bars. The other annealings are carried out in an enclosed chamber in air at a temperature of about 1000 degrees C. for one hour.

After the refractory alloy body has been hammered down to a diameter of 40 to 35 mills, or thousands of an inch, it is subjected to the ductilizing process of my Patent No. 1,470,175. In this operation the hammered material is coiled into rings of about 1½ to 2 feet in diameter and tied together with molybdenum wire. These coils are placed into an enclosed chamber maintained at a temperature of a red or dull red heat through which a very slow flow of air is maintained. At this temperature, the outer surface of the alloy wire is coated with a dense compact layer of a refractory oxide as indicated at 50 in Fig. 7. The wire is subjected to this treatment for 12 to 14 hours. Through the combined action of this envelope of refractory oxide and heat, the ductility of the coiled material is decidedly increased and the material is compacted and softened so that it may be drawn down through diamond dies. Through this treatment, a material which was very brittle can be rendered so pliable that it can be bent back and forth without breaking.

After the coils are permitted to cool the outer layer of oxides is removed, by placing them into vats containing hot solution of concentrated caustic soda, leaving the inner core of ductile alloy wire suitable for drawing. After removing the oxide, the original diameter of the wire that had increased by at least 10 mills or ten thousands of an inch because of the oxide coating, is reduced to a diameter of about 30 to 32 mills.

When alloys having a high percentage of thorium are to be treated, a combination of the metal with hydrogen from the reducing atmosphere in which the alloy is to be treated is to be avoided. For this purpose the alloy may be hammered and drawn down inside and covered with an outer sleeve of tungsten steel so that the reducing atmosphere can not affect the inside of the alloy. This is, however, not necessary with alloys of low thorium content.

Through the above steps the body has been formed into a billet of a high degree of ductility and malleability that enables it to be drawn into filaments. This is accomplished in a drawing and finishing operation forming a part of this invention.

In this operation the wires obtained in the above manner are drawn through high speed steel dies or special tungsten dies or diamond dies, to the desired diameters, the latter dies being used for the finer diameters. This may be done at a red or dull red heat, or cold with intermediate annealing. I prefer, however, to carry on this operation on standard wire equipment such as that illustrated in Fig. 8, heated through hot oil or hot lubricants which is circulated as a lubricating medium. In this apparatus the wire is drawn through dies held in a die holder 52 upon which hot oil flows from the jets 54. The oil is collected and is drawn through a heating coil 56 and returned to the jets by means of a pump 58. In order to reduce the die wear to a minimum, the wire may be coated with a soft metal such as copper or nickel, although this is not necessary.

After the alloy mixture has been drawn down into wire of a diameter suitable for filamentary purposes, it is subjected to a finishing operation consisting of a combined cleaning, annealing and flashing action. This may be done in an apparatus such as that shown in Fig. 8. In this apparatus a spool 60 of the drawn wire is placed on a spool holder 62 so constructed that a suitable tension may be imparted to the wire by means of weights 64. The wire first passes through an electrolytic cell 66 in which the coating of graphite or other lubricating material or a coating of copper or nickel are to be removed. The wire then passes through a water bath 68 in which it is washed clean and then passes into a hydrogen flashing apparatus 70 in which a permanent set is imparted to the filament and a grain structure started that is particularly desirable in metallic bodies operating at high temperatures.

In passing through the electrolytic apparatus the wire is first heated to a dull red heat then brought into contact with an electrolyte, such as a water solution of salt causing the outer covering to flake from the wire and enabling the wire to be further cleaned by electrolytic action. For this purpose the cell 66 is constructed of a tube of hard rubber closed at its ends by walls 72 and 74 and divided into two compartments 76 and 78 by means of an intermediate partition 80. In entering the cell the wire first passes through a slotted mercury contact 82, in the wall 72, connected through a lead conduit 83, rheostat 83' and switch 83" with a source of electric energy 84.

The wire then passes successively through a slotted mercury contact 85 in the wall or partition 80 and through a slotted mercury contact 86 in the wall 74. Current is supplied through the lead conductor 83 and the contact 82 through the portion of wire in the compartment 76 and the wire is accordingly heated to a dull red heat in this compartment. As the wire passes into the electrolytic compartment 78 and comes into contact with the electrolyte the graphite lubricant flakes off and the wire is further cleaned by the electrolytic action of the current which passes between the wire and an electrode 87 in the compartment 78 which is connected by a lead 88 with the source of electric energy 84. When graphite lubricant or a similar lubricating substance is to be removed the electrolyte in compartment 78 is a concentrated solution of caustic soda, while if copper or nickel are to be removed a weak acid or bisulphate electrolyte is used.

The electrolyte is washed from the wire in the water bath 68.

In the flashing apparatus 70 the wire is heated for a short time in an atmosphere of hydrogen. For this purpose, the wire passes through a mercury cup 90 connected to the electric generator 84 through a lead wire 91 and rheostat 92 and mounted in one end of the flashing apparatus. The wire then passes through the flashing chamber and through a second mercury cup 93 movably mounted so that it may be moved towards and away from the cup 90 to vary or adjust the length of time during which the wire is to be heated, and connected through a return lead 94 to the generator 84. The current may be adjusted by means of the rheostat 92 or switch 93 to flash the wire at a bright heat.

The wire then passes through a third mercury cup 95 and then over a counting wheel 96 operating a revolution counter 99 to a winding spool 97 driven by a motor 98.

The product resulting from the above described process is a filamentary substance of high-electron and light emissive qualities, which can be operated at high temperatures without altering its structure as quickly or readily as substantially pure tungsten, retaining its ductility longer and showing but little sagging in coil form. Each of the ingredients of the composition contributes to the various qualities of the composition and has a function in producing the final result. The thorium contributes to the high electron emission qualities and to produce a body more malleable and ductile than tungsten; the vanadium augments the electron emissive qualities still further and imparts toughness and strength; the yttrium or refractory, difficultly reducible rare earth oxides restrain the grain growth and raise the light emitting quality; the silica or silicon serve to harden the metallic base at higher temperatures so that sagging is reduced; and finally, the alkali oxides such as those of sodium and potassium through the formation of tungsten bronzes at the grain boundaries directs the growth of the grains lengthwise, thereby imparting an interlacing structure of long overlapping grains to the filament. The combined effect results in a superior filamentary and electron emitting body. The proportions of the various constituents may be varied within reasonable limits without departing from my invention.

The analysis of the powder from which the refractory alloy body is prepared is substantially as follows:

| | Per cent by weight. |
|---|---|
| Tungsten metal | 98.35—91.00 |
| Thorium metal | .50— 5.00 |
| Sodium vanadate | .25— 1.00 |
| Potassium silicate | .35— .50 |
| Yttrium oxide | .55— 2.50 |

The analysis of the filamentary wire after it is finally in condition and ready for use is about as follows:

| | Per cent by weight. |
|---|---|
| Tungsten metal | 98.4 —90.7 |
| Thorium metal | 0.5 — 5.0 |
| Sodium oxide as tungsten bronze | .05— 0.1 |
| Potassium oxide as tungsten bronze | .08— 0.2 |
| Silica | .25— 1.0 |
| Yttrium or refractory oxides | .50— 2.0 |
| Vanadium | .05— 0.5 |

As changes of operation could be made within the scope of my invention it is intended that all matter contained in the above description or shown in the accompanying drawings shall be interpreted as illustrative and not in a limiting sense.

Having described the invention, what I claim and desire to secure by Letters Patent is:

1. A composition of matter comprising tungsten, thorium and vanadium, the tungsten comprising more than 90% and the vanadium 0.50% or less of the composition, a finely divided yttrium oxide interspersed throughout said composition.

2. A composition of matter comprising a tungsten, thorium, and vanadium alloy, and finely divided particles of yttrium oxide interspersed throughout said composition, the tungsten comprising 90% or more, the thorium from 0.50 to 5.0%, the vanadium 0.50% or less and the yttrium oxide from 0.55 to 2.50% of the composition.

3. A composition of matter comprising an alloy of tungsten, thorium, vanadium, and silica, and yttrium oxides interspersed throughout said composition, the tungsten comprising over 90% of the composition.

4. A composition of matter comprising, tungsten, thorium, vanadium, having finely divided particles of yttrium oxide and silica interspersed through said composition and the tungsten comprising 90% or more, the thorium from 0.50 to 5.0%, the vanadium 0.50% or less, the yttrium oxide from 0.55 to 2.50% and the silica from 0.25 to 1.0% of the composition.

5. A composition of matter of high electron and light emitting properties comprising interlacing crystals of an alloy of tungsten, thorium and vanadium, interspersed with grains of difficultly reducible refractory oxides.

6. A filamentary body of high electron and light emitting properties comprising interlacing crystals of tungsten, thorium and vanadium, interspersed with grains of difficultly reducible refractory oxides.

7. A filament for incandescent lamps comprising tungsten, thorium and vanadium, the crystals of which are interspersed with grains of difficultly reducible refractory oxides.

8. A filamentary body comprising 94% 98% tungsten, 1% to 5% thorium, 0.05% 0.5% vanadium, and whose crystals are interspersed with 1.2% of refractory, light emitting oxides.

9. A composition of matter comprising an alloy of tungsten, thorium and vanadium with refractory difficultly reducible oxides interspersed throughout said composition.

10. A process of producing refractory filamentary bodies which comprises compacting the constituent powders into a homogeneous coherent billet by combined heat and pressure, subjecting the billet to a heat-treatment, hammering said billet at a high temperature, forming a refractory oxide envelope thereon, ductilizing and annealing the oxide enveloped billet and then wire-drawing it to the desired diameters.

CLEMENS A. LAISE.